United States Patent
Chini et al.

(10) Patent No.: US 10,024,214 B2
(45) Date of Patent: Jul. 17, 2018

(54) SCR DEVICE WITH VALVE ARRANGEMENT

(71) Applicant: Röchling Automotive SE & Co. KG, Mannheim (DE)

(72) Inventors: Fabrizio Chini, Isera (IT); Luca Marini, Besenello (IT)

(73) Assignee: RÖCHLING AUTOMOTIVE SE & CO. KG, Mannheim (DE)

( * ) Notice: Subject to any disclaimer, the term of this patent is extended or adjusted under 35 U.S.C. 154(b) by 0 days.

(21) Appl. No.: 15/470,101

(22) Filed: Mar. 27, 2017

(65) Prior Publication Data

US 2017/0284259 A1   Oct. 5, 2017

(30) Foreign Application Priority Data

Apr. 4, 2016   (DE) .................. 10 2016 205 555

(51) Int. Cl.
  *F01N 3/00*   (2006.01)
  *F01N 3/20*   (2006.01)

(52) U.S. Cl.
  CPC ........ *F01N 3/2066* (2013.01); *F01N 2610/02* (2013.01); *F01N 2610/1433* (2013.01);
(Continued)

(58) Field of Classification Search
  USPC ......... 60/274, 276, 286, 295, 297, 301, 303; 239/410, 411, 533.11, 533.13, 416.4
  See application file for complete search history.

(56) References Cited

U.S. PATENT DOCUMENTS 7,654,080 B2 * 2/2010 Ripper ................... B01D 53/90
  239/410

8,161,735 B2 * 4/2012 Kitazawa .............. F01N 3/2066
  60/295

(Continued)

FOREIGN PATENT DOCUMENTS

DE   10 2007 028 480 A1   12/2008
DE   10 2011 088 705 A1   6/2013
(Continued)

OTHER PUBLICATIONS

Espacenet Bibliographic data:DE102007028480 (A1), Published Dec. 24, 2008, 2pgs.
(Continued)

*Primary Examiner* — Binh Q Tran
(74) *Attorney, Agent, or Firm* — Rankin, Hill & Clark LLP

(57) ABSTRACT

An SCR device for a motor vehicle, comprising a tank for storing reducing liquid, an injection device for injection of the reducing liquid into an exhaust gas system of a motor vehicle, a liquid conduit for delivering reducing liquid from the tank to the injection device, a feed pump for conveying reducing liquid in the conduit, and a valve arrangement in the conduit, the valve arrangement designed to interrupt an injection flow in the conduit when the tank-side pressure is greater, than the injection device-side pressure in the conduit by less than an injection threshold value, and to allow the injection flow to pass when the tank-side pressure is greater by at least the injection threshold, the valve arrangement designed to interrupt a return flow in the conduit from the injection device to the tank when the injection device-side pressure is greater than the tank-side pressure by less than a return threshold value, and to allow the return flow to pass through when the injection device-side pressure is greater than the tank-side pressure in the conduit, by at least the return threshold value, the injection threshold value being greater than the return threshold value.

16 Claims, 2 Drawing Sheets

(52) U.S. Cl.
CPC ......... *F01N 2610/1453* (2013.01); *F01N 2610/1473* (2013.01); *F01N 2900/1808* (2013.01); *Y02A 50/2325* (2018.01); *Y02T 10/24* (2013.01)

(56) References Cited

U.S. PATENT DOCUMENTS

| | | | |
|---|---|---|---|
| 8,893,480 B2* | 11/2014 | Chiba | F01N 3/208 60/286 |
| 9,404,408 B2* | 8/2016 | Bauer | B01D 53/90 |
| 2009/0301068 A1 | 12/2009 | Fujita et al. | |
| 2015/0034189 A1* | 2/2015 | Burger | F01N 3/2066 137/565.01 |

FOREIGN PATENT DOCUMENTS

| | | |
|---|---|---|
| DE | 10 2012 202 668 A1 | 8/2013 |
| DE | 10 2013 107 373 A1 | 1/2015 |
| WO | 2015/078777 A1 | 6/2015 |

OTHER PUBLICATIONS

Espacenet Bibliographic data:DE102011088705 (A1), Published Jun. 20, 2013, 1pg.
Espacenet Bibliographic data:DE102012202668 (A1), Published Aug. 22, 2013, 1pg.
Espacenet Bibliographic data:DE102013107373 (A1), Published Jan. 15, 2015, 3pgs.
German Search Report for corresponding DE 10 2016 205 555.0 dated Dec. 5, 2016, 7 pgs.

\* cited by examiner

SCR DEVICE WITH VALVE ARRANGEMENT

The present invention relates to an SCR device for a motor vehicle, comprising a tank for storing reducing liquid, in particular aqueous urea solution, an injection device for injection of the reducing liquid into an exhaust gas system of a motor vehicle, a liquid conduit for delivering reducing liquid from the tank to the injection device, a feed pump for conveying reducing liquid in the liquid conduit, and a valve arrangement present in the liquid conduit.

BACKGROUND OF THE INVENTION

A generic SCR device is known for example from DE 10 2007 028 480 A1. This known SCR device has a valve arrangement at the upstream end of the liquid conduit, wherein the valve arrangement is designed to close the liquid conduit when a filling level of the reducing liquid in the tank reaches or falls below a minimum filling level.

SCR devices are generally known in order, by injection of a reducing liquid, as a rule aqueous urea solution, into the exhaust gas system of a motor vehicle, to reduce nitrogen oxides present there and thus to decrease the emission of pollutants from the vehicle.

SUMMARY OF THE INVENTION

In this case an object of the present invention is to modify the above-mentioned SCR device in such a way that reducing liquid can flow at least in the flow direction from the tank to the injection device only when the feed pump is in operation. When the feed pump is not in operation, a flow of reducing liquid in the liquid conduit should be prevented at least in said direction from the tank to the injection device. In this way a very precise injection control can be achieved. Moreover, this simplifies the dismantling of the SCR device, since in this way an undesirable leakage of reducing liquid from the SCR device can be prevented or at least greatly limited in terms of quantity.

There is already a solution for this in the prior art, although it has an unnecessarily complicated construction: In this connection WO 2015/078777 A1 proposes the arrangement in the feed pump of a siphon that prevents undesirable fluid flow.

However, the present invention achieves the aforementioned object without the need for a modification to the feed pump, by an SCR device of the aforementioned type, wherein the valve arrangement is designed to interrupt an injection flow in the liquid conduit from the tank to the injection device when the tank-side pressure in the liquid conduit on the tank side of the valve arrangement is greater, in terms of amount, than the injection device-side pressure in the liquid conduit on the injection device side of the valve arrangement, by less than an injection threshold value, and to allow the injection flow to pass through when the tank-side pressure is greater, in terms of amount, than the injection device-side pressure, by at least the injection threshold value, and wherein the valve arrangement is designed to interrupt a return flow in the liquid conduit from the injection device to the tank when the injection device-side pressure is greater, in terms of amount, than the tank-side pressure in the liquid conduit, by less than a return threshold value, and to allow the return flow to pass through when the injection device-side pressure is greater, in terms of amount, than the tank-side pressure in the liquid conduit, by at least the return threshold value, the injection threshold value being greater in terms of amount than the return threshold value.

Thus it is ensured that a flow of reducing liquid in the liquid conduit only takes place when, by operation of the feed pump, a sufficient pressure difference exists between the tank side of the valve arrangement facing the tank and the injection device side of the valve arrangement facing the injection device. On the other hand, if the feed pump is switched off, a corresponding pressure difference no longer exists, so that at least the injection flow can no longer override the valve arrangement.

The threshold values that differ in terms of amount ensure that for the return flow of reducing liquid from the injection device to the tank a smaller pressure difference is sufficient in order to enable the return flow than for the injection flow in the opposite direction. Thus after the end of the injection flow from the tank to the injection device a return flow with a lower pressure difference and consequently also with lower volumetric flows per unit of time can be implemented, in order to be able to empty the liquid conduit for the period of time in which no injection of reducing liquid into an exhaust gas stream of a motor vehicle takes place. A lower pump output than the pump output necessary for generation of the injection flow is sufficient for this emptying.

The feed pump is usually provided in the flow path between the tank and the injection device. The valve arrangement is preferably arranged between the feed pump and the injection device.

In order to be sure that only sufficiently pure reducing liquid from the tank reaches the injection device, the SCR device can advantageously include a filter. This is preferably either provided in the tank, for instance in the vicinity of a removal point for reducing liquid from the tank, or the filter can be provided outside the tank, likewise preferably in the immediate vicinity of the removal point for reducing liquid from the tank. Alternatively, or in addition, the valve arrangement can be arranged between the filter and the feed pump, and thus more than only one valve arrangement can also be provided.

The arrangement of the valve arrangement between the feed pump and the injection device is therefore preferable, because then during emptying of the liquid conduit by the return flow no column of liquid, that in some circumstances can no longer be conveyed further back into the tank, remains between the valve arrangement and the feed pump.

For emptying of the liquid conduit as completely as possible the feed pump is preferably also provided close to the tank, particularly preferably directly on the tank or even in the tank. For a space-saving arrangement of the SCR device, the feed pump can be arranged on a tank wall of the tank.

In principle it is conceivable to use two feed pumps, namely a first feed pump to produce the injection flow and a second feed pump to produce the return flow. In this case a separately provided feed pump can be provided in a discrete liquid conduit. The two separate liquid conduits meet on the tank side at the latest in the common tank volume and meet on the injection device side at the latest in a common chamber or in a common flow section before an injection nozzle. Then a respective partial valve arrangement can be provided in each of the liquid conduits. However, this expenditure on apparatus appears comparatively high.

Therefore, in order to provide an SCR device according to the invention with the lowest possible expenditure on apparatus and construction, it is preferable if the feed pump is a bidirectionally operating pump that is designed to produce both the pressure difference that causes the injection flow and also the pressure difference that causes the return flow. Thus, by reversal of the conveying direction at the feed pump, both the injection flow and also the return flow through one and the same feed pump can be produced. Therefore, just one liquid conduit can be sufficient.

In order to reliably ensure that, in spite of the feed pump being at a standstill, reducing liquid can override the valve arrangement at least in the injection flow direction, that is to say in the direction from the tank to the injection device, it is preferable if the injection threshold value is greater than a hydrostatic pressure that is produced by reducing liquid introduced up to a predetermined rated maximum filling level of the tank. In the case of a tank of otherwise known design, a predetermined rated maximum filling volume of the tank is equivalent to a predetermined rated maximum filling level. When a tank of known design is filled with a predetermined rated maximum volume, the liquid level always has the same rated maximum filling level above the bottom of the tank. As already indicated in the introduction, after a temporary end to operation of the SCR device, for emptying of the liquid conduit a moderate pressure difference is sufficient in order to convey the reducing liquid still located in the liquid conduit back into the tank. Here a maximum flow rate of 3.5 l/h is not usually exceeded for the return flow. The maximum flow rate of the return flow is preferably between 0 and 3 l/h.

In contrast to this, the maximum flow rate of the injection flow is higher, since here a specific mass flow of reducing liquid corresponding to the exhaust gas stream must be injected into the exhaust gas in order to be able to reduce the nitrogen oxides contained therein to a sufficient extent. However, as a rule the maximum flow rate of the injection flow does not exceed 7 l/h and is preferably between 3 and 6 l/h.

If, as is preferred in principle, only one single liquid conduit is used for injection flow and return flow, the different feed pump output can be recognized from the different flow rates of the injection flow and the return flow used in this case.

The feed pump is preferably a geared pump that can simply reverse its conveying direction by reversal of the direction of rotation.

For reliable interruption of the liquid flow in the liquid conduit the valve arrangement can have at least one valve body that is biased into a closed position in opposing working directions to different extents by at least one pretensioning device. The pretensioning device may be a pretension spring. However, the pretensioning device may be identical to the valve body, for example if a flexible leaf spring is used as the valve body.

In principle it may be sufficient to provide only one valve body that can be displaced from its closed position, in which it interrupts a liquid flow, into an open position. For example, the single valve body can be redirected in opposite directions in the valve arrangement, from a closed position into an open position, by pretensioning devices acting to different extents or by only one pretensioning device acting in only one of two possible directions of movement.

However, since sealing problems can occur in the closed position when only one single valve body is used, it is preferable if the valve arrangement has a separate valve body for each of the injection flow and the return flow, and at least the injection valve body associated with the injection flow is biased into a closed position by a pretensioning device. Due to the biasing of valve bodies into the closed position it can be ensured that the valve interrupts a liquid flow in the liquid conduit without action from the exterior.

In order to enable an injection flow, on the one hand, and a return flow, on the other hand, in the liquid conduit, the aforementioned pressure difference, differing in terms of amount, can be produced for the injection valve body, on the one hand, and for the return valve body, on the other hand, by pretensioning devices acting with different strengths. The return valve body can also be arranged without a pretensioning device and can be preloaded into the closed position by the hydrostatic pressure of the reducing liquid accommodated in the tank. Additionally, or alternatively, the pressure difference acting with different strengths can also be produced by corresponding configuration of the valve body and active surfaces of different sizes, on which the prevailing pressure in the liquid conduit acts on the valve body.

A valve ball or also an umbrella valve body that is known per se can be used, for example as the valve body. As a rule, the umbrella valve body has a central stem that supports the umbrella valve body movably in a valve housing along the stem axis. The umbrella valve body can then be displaced along its stem between the closed position, in which it interrupts a liquid flow, and an open position, in which it allows the liquid flow to pass through. On a long end of the valve stem the umbrella valve body then has a formation that projects radially like an umbrella and serves for closure of through openings in the valve housing in the closed position. The umbrella valve body is preferably rotationally symmetrical.

When the valve arrangement has a plurality of valve bodies, for instance an injection valve body for the injection flow and a return valve body for the return flow, all valve bodies are preferably of the same construction, in order to simplify the assembly. In this case all valve bodies may be identical, in order to avoid confusions during assembly. The identical valve bodies can be subjected to force by different pretensioning means, or only one part of the identical valve bodies can co-operate with pretensioning means, but another part does not.

Due to the arrangement of the valve arrangement discussed above in the liquid conduit of the SCR device, after emptying of the liquid conduit by generation of a return flow the liquid conduit can be closed in an advantageous manner at the valve arrangement, for example in order to replace conduit portions between the valve arrangement and the injection device or between the valve arrangement and the feed pump. For this purpose, in an advantageous further embodiment of the present invention it can be provided that on the injection device side of the valve arrangement, preferably directly on the valve arrangement, the liquid conduit can be properly separated, preferably from a valve housing of the valve arrangement. "Proper separation" means non-destructive separation, for example by the provision of a releasable screwed or/and plug-in connection of the individual liquid line portions to one another.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
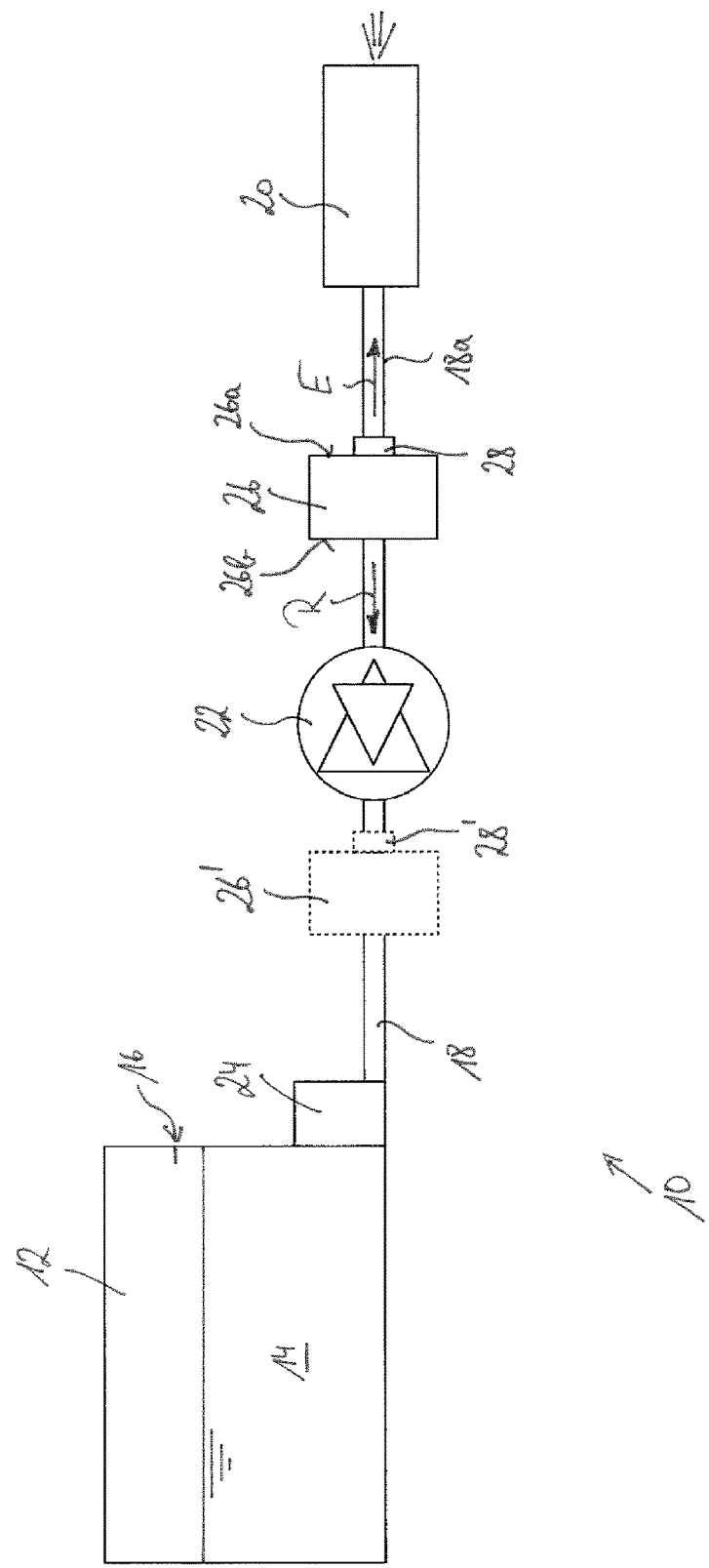
FIG. 1 shows a rough schematic representation of an SCR device according to the invention; and, FIG. 2 shows a cross-sectional view through an example of a valve arrangement as it could be used in the SCR device according to FIG. 1.

Referring now to the drawings wherein the showings are for the purpose of illustrating preferred and alternative embodiments of the invention only and not for the purpose of limiting the same, FIG. 1 shows an SCR device according to certain aspects of the invention that is designated generally by 10. The SCR device, which serves for reduction of nitrogen oxides in the exhaust gas of an internal combustion engine of a motor vehicle, comprises a tank 12, in which reducing liquid 14, for example aqueous urea solution, can be introduced up to a rated filling level 16 according to regulations. A filling line and the like is not shown in FIG. 1, since it does not play any further role for the SCR device according to the present invention.

The reducing liquid 14 can be conveyed by means of a liquid conduit 18 to an injection device 20, where it is injected into an exhaust gas from an internal combustion engine in an exhaust gas system that is not shown in FIG. 1.

In order to convey the reducing liquid 14 from the tank 12 to the injection device 20 a feed pump 22 is provided, for instance in the form of a reversible geared pump.

As is indicated by the arrows pointing in the opposite direction, the feed pump 22 can produce both an injection flow E from the tank 12 to the injection device 20 and also a return flow R in the reverse direction from the injection device 20 into the tank 12. As is indicated by the smaller triangle pointing in the direction of the return flow R, the feed pump 22 conveys in the return direction with a smaller volume or mass flow than in the injection flow direction.

A filter housing 24, preferably provided directly on or in the tank 12, is provided for purification of the reducing liquid 14 conveyed to the injection device 20.

In order to ensure that reducing liquid 14 actually only flows in the liquid conduit 18 when a corresponding pressure gradient is implemented in the liquid conduit 18 by the feed pump 22, the SCR device 10 comprises a valve arrangement 26 that is preferably arranged between the feed pump 22 and the injection device 20. A valve arrangement 26' can also be arranged, additionally or alternatively, between the tank 12 or the filter 24 and the feed pump 22.

Since the valve arrangement 26 is designed to prevent a leakage flow of reducing liquid 14 from the tank 12 to the injection device 20 if the feed pump 22 is not correspondingly in operation, between the valve arrangement 26 and the liquid conduit 18, more precisely the liquid conduit portion 18a on the injection device side 26a of the valve arrangement 26, a line connection 28 can be provided that is detachable in operation and enables a proper detachability of the liquid conduit 18 from the valve arrangement 26, for example, for repair and/or maintenance. The same applies for a reconnection of the liquid conduit 18 on the injection device side 26a of the valve arrangement 26.

The side 26b of the valve arrangement 26 that is opposite the injection device 26a, is directed towards the tank 12 and is connected thereto is the tank side 26b of the valve arrangement 26.

Figure 2:
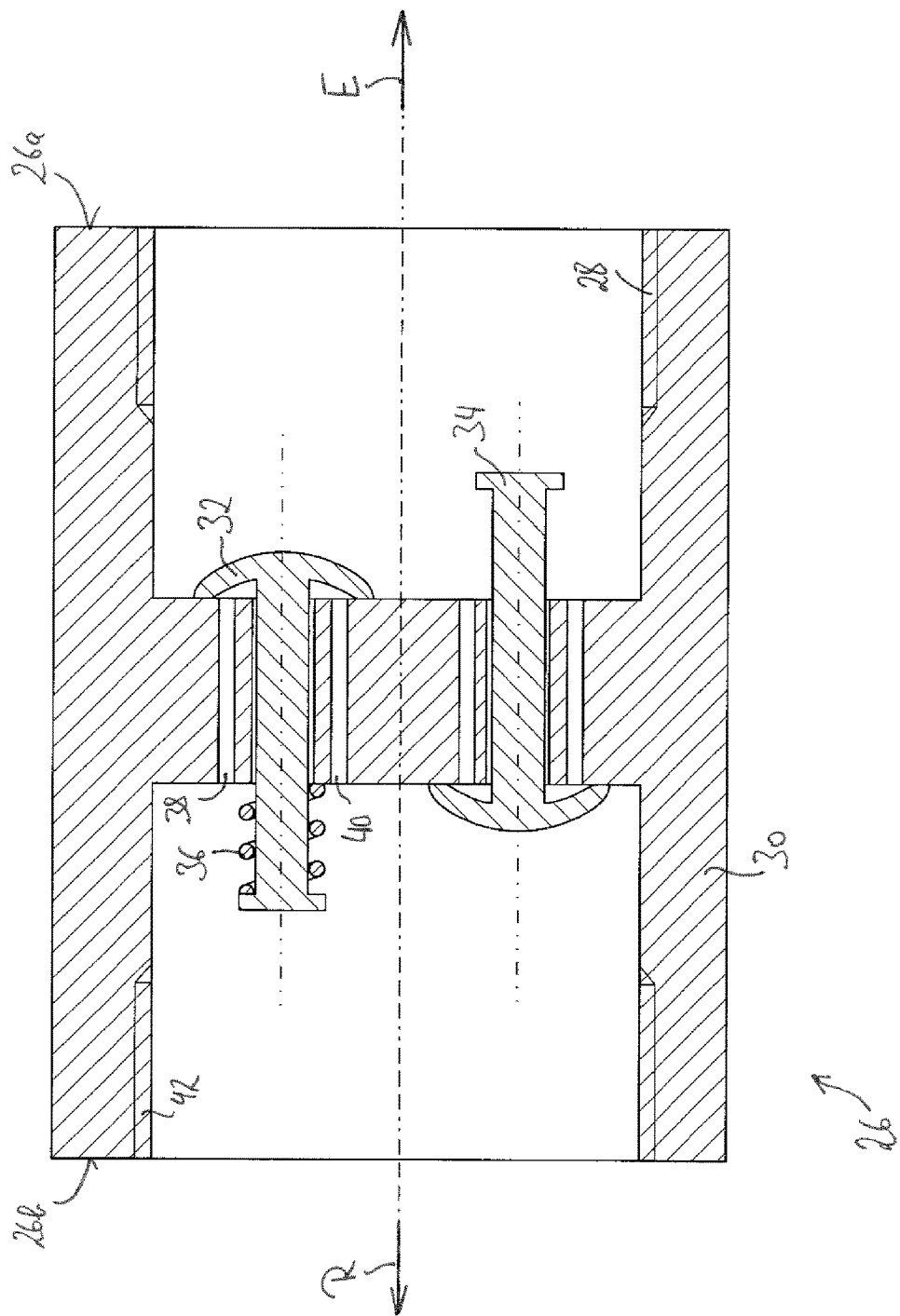

A possible construction of the valve arrangement 26 is shown roughly schematically in FIG. 2.

The valve arrangement 26 can have a valve housing 30, in which valve bodies 32 and 34 can be movably provided.

The two valve bodies 32 and 34 are preferably configured identically, in the illustrated example as an umbrella valve body. In this case the valve body 32 is an injection valve body 32 that interrupts an injection flow E until the pressure difference between the tank side 26b and the injection device side 26a of the valve arrangement 26 exceeds a predetermined pressure difference. With a predetermined configuration of the injection valve 32, the pressure difference, that is sufficient for a displacement of the injection valve body 32 out of the closed position shown in FIG. 2 into an open position allowing the injection flow E, is adjustable by the spring stiffness of a valve spring 36 by which the injection valve body 32 is preferably biased into the closed position shown in FIG. 2.

In the closed position the injection valve body 32 closes through openings 38 and 40 for the injection flow E through the valve arrangement 26.

The valve spring 36, that is supported on the long end of the valve stem of the injection valve body 32 facing away from the valve, is selected so that with a predetermined configuration of the injection valve body 32 this valve remains in the closed position under the action of the hydrostatic pressure of the reducing liquid 14 accommodated in the tank 12, even when the reducing liquid 14 is introduced into the tank 12 up to its rated maximum filling level 16. The valve spring 36 is preferably designed with a safety margin, that also enables the rated maximum filling level 16 in the tank 12 to be exceeded without the resulting hydrostatic pressure of the reducing liquid 14 being able to move the injection valve body 32 out of the closed position.

The valve body 34 is the return valve body 34 that is open for the return flow R and is closed for the injection flow E.

The return valve body 34 and the arrangement thereof in the valve housing 30 correspond to that of the injection valve body 32, only in the opposite direction, and therefore, taking the difference of direction into consideration, reference is made to the foregoing description of the injection valve body 32 for explanation of the return valve body 34.

The pressure difference at which the return valve body 34 is open for the return flow R is less, in terms of amount, than the pressure difference that is necessary for a displacement of the injection valve body 32 out of the closed position.

In the case of the preferred use of identical valve bodies 32 and 34, this pressure difference can be achieved by the use of a weaker valve spring or by the complete omission of a valve spring.

Since in comparison to the injection flow E the return flow R usually takes place with a lower flow rate, it is justified for the return valve body 34 to exit the closed position. Biasing into the closed position, as illustrated in FIG. 2, is not necessary, but takes place in any case due to the hydrostatic pressure of the reducing liquid 14 on the tank side 26b of the valve arrangement 26. Therefore, for the return flow R it is only necessary to overcome the friction existing between the valve housing 30 and the return valve body 34 in order to displace the return valve body 34 out of the closed position illustrated in FIG. 2 into an open position.

Thus when the injection device 20 is not in use, for example when the motor vehicle and the internal combustion engine are switched off, by means of the single feed pump 22 the liquid conduit 18 can be emptied at least in the portion extending from the feed pump 22 to the injection device 20, so that the conduit portion 18a of the liquid conduit 18 located between the valve arrangement 26 and the injection device 20 can be released without undesirable escape of reducing liquid from the valve arrangement 26. For this purpose, the valve arrangement 26, in particular the valve housing 30, can have a thread as a releasable connecting device 28 for connection of the valve arrangement 26 to the liquid conduit 18. The internal thread can be provided on both sides of the valve arrangement 26, in order to remove the valve arrangement 26, if necessary, completely from the liquid conduit 18. The thread formation on the tank side 26b of the valve housing 30 is designated by 42. to be able Thus connection pieces of the liquid conduit can be screwed into the internal thread 28 and 42 in order to achieve a liquid-tight connection.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An SCR device for a motor vehicle, comprising a tank for storing an associated reducing liquid, in particular aqueous urea solution, an injection device for injection of the associated reducing liquid into an associated exhaust gas system of an associated motor vehicle, the SCR device having a liquid conduit for delivering the associated reducing liquid from the tank to the injection device, a feed pump for conveying the associated reducing liquid in the liquid conduit, and a valve arrangement in the liquid conduit, the valve arrangement being designed to interrupt an injection flow in the liquid conduit from the tank to the injection device when a tank-side pressure in the liquid conduit on a tank side of the valve arrangement is greater, in terms of amount, than an injection device-side pressure in the liquid conduit on an injection device side of the valve arrangement, by less than an injection threshold value, and to allow the injection flow to pass through when the tank-side pressure is greater, in terms of amount, than the injection device-side pressure, by at least the injection threshold value, the valve arrangement being designed to interrupt a return flow in the liquid conduit from the injection device to the tank when the injection device-side pressure is greater, in terms of amount, than the tank-side pressure in the liquid conduit, by less than a return threshold value, and to allow the return flow to pass through when the injection device-side pressure is greater, in terms of amount, than the tank-side pressure in the liquid conduit, by at least the return threshold value, the injection threshold value being greater in terms of amount than the return threshold value.

2. The SCR device according to claim 1, wherein the valve arrangement is arranged between the feed pump and the injection device.

3. The SCR device according to claim 1, further comprising a filter, wherein the valve arrangement is arranged between the filter and the feed pump.

4. The SCR device according to claim 1, wherein the feed pump is a bidirectionally operating pump that is designed to produce both the pressure difference that causes the injection flow and also the pressure difference that causes the return flow.

5. The SCR device according to claim 1, wherein the tank has a predetermined rated maximum filling level, and wherein the injection threshold value is greater than a hydrostatic pressure that is produced by reducing the associated liquid introduced up to the rated maximum filling level.

6. The SCR device according to claim 1, wherein at least one of a maximum flow rate of the injection flow does not exceed 7 l/h and the maximum flow rate of the return flow does not exceed 3.5 l/h.

7. The SCR device according to claim 1, wherein at least one of a maximum flow rate of the injection flow is between 3 and 6 l/h and the maximum flow rate of the return flow is between 0 and 3 l/h.

8. The SCR device according to claim 1, wherein the valve arrangement has at least one valve body that is biased into a closed position in opposing working directions with different strengths by at least one pretensioning device.

9. The SCR device according to claim 1, wherein the valve arrangement includes a first valve body and a second valve body, the first valve body being biased into a closed position in a first working direction by a first pretension force, and the second valve body being biased into a closed position in a second working direction by a second pretension force, the first working direction being opposite of the second working direction, the first pretension force being greater than the second pretension force.

10. The SCR device according to claim 9, wherein at least one of the first pretension force and the second pretension force is produced by a pretensioning device.

11. The SCR device according to claim 9, wherein the first valve body is an injection valve body that is in an opened position during the injection flow and the second valve body is a return valve body that is in an opened position during the return flow.

12. The SCR device according to claim 9, wherein the first valve body is an injection valve body that is in an opened position only during the injection flow and the second valve body is a return valve body that is in an opened position only during the return flow.

13. The SCR device according to claim 1, wherein the valve arrangement has a separate valve body for each of the injection flow and the return flow, and at least the injection valve body associated with the injection flow is biased into a closed position by a pretensioning device.

14. The SCR device according to claim 8, wherein the at least one valve body includes at least one of a valve ball and an umbrella valve body.

15. The SCR device according to claim 14, wherein the at least one valve body are all the same type of valve body.

16. The SCR device according to claim 1, wherein on the injection device side of the valve arrangement, the liquid conduit can be operationally separated, preferably from a valve housing of the valve arrangement.

* * * * *